United States Patent [19]
Hirzel

[11] 4,293,165
[45] Oct. 6, 1981

[54] ELECTRONIC CONTROL BRAKE AND SKID CONTROL SYSTEM
[75] Inventor: Edgar A. Hirzel, Granada Hills, Calif.
[73] Assignee: Crane Co., New York, N.Y.
[21] Appl. No.: 872,654
[22] Filed: Jan. 26, 1978
[51] Int. Cl.³ ............................................. B60T 8/20
[52] U.S. Cl. ..................................... 303/93; 244/111
[58] Field of Search .................. 303/93, 20, 100, 106, 303/109; 244/111

[56] References Cited
U.S. PATENT DOCUMENTS

| 3,520,575 | 7/1970 | Steigerwald | 303/93 |
| 3,702,714 | 11/1972 | Branson | 303/93 |
| 3,711,163 | 1/1973 | Booher | 303/93 |
| 3,776,605 | 12/1973 | Ruof | 303/100 |
| 3,874,742 | 4/1975 | Takayama | 303/109 |
| 4,078,845 | 3/1978 | Amberg | 244/111 |

Primary Examiner—J. D. Miller
Assistant Examiner—Reinhard J. Eisenzopf
Attorney, Agent, or Firm—Hume, Clement, Brinks, Willian & Olds, Ltd.

[57] ABSTRACT

An electronically controlled braking system is disclosed and includes a brake servo valve for controlling brake pressure in response to an electrical brake actuating signal having a value which is controlled by a brake command circuit and a skid control circuit. The brake command circuit provides a brake command signal which is representative of the brake pressure determined by an operator or by an automatic braking system. The brake command signal is modified as a function of the skid control circuit output to provide the electrical brake actuating signal which is supplied to a valve driver for actuating the brake control coil of the brake servo valve.

27 Claims, 4 Drawing Figures

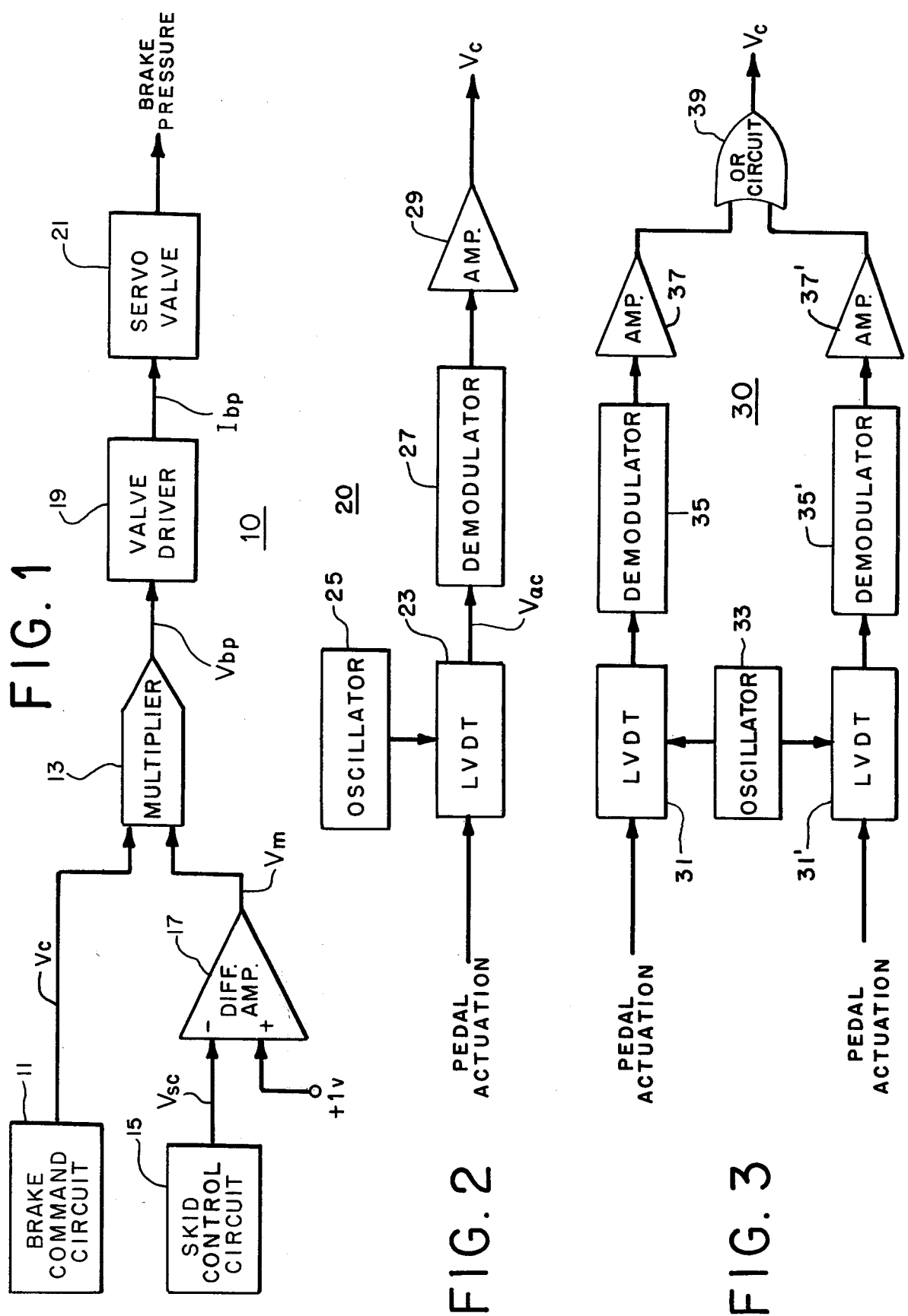

ELECTRONIC CONTROL BRAKE AND SKID CONTROL SYSTEM

BACKGROUND OF THE INVENTION

The disclosed invention relates to electronically controlled braking systems. Specifically, the present invention relates to a braking system wherein a brake command circuit cooperates with skid control circuitry to provide electrical control of a brake servo valve which meters the hydraulic pressure applied to appropriate brake cylinders.

The prior art includes electronically controlled braking systems wherein operator pedal actuated transducers and skid control circuitry cooperate to determine a braking pressure. However, a major disadvantage of such prior art systems is the fact that the skid control circuitry reduces the braking pressure solely as a function of the skid control circuitry output. That is, the reduction in brake pressure is an absolute amount determined by the skid control circuitry, irrespective of the brake pressure being commanded by the operator.

For example, in a subtractive braking system wherein the skid control circuitry functions to subtract from the operator brake command signal, an overdump condition can easily occur. This is particularly critical where less than full pressure is commanded by the operator and the skid control circuitry commands a pressure release having a value greater than the value of the commanded pressure.

Thus, it is readily apparent that prior art electronically controlled braking systems wherein antiskid pressure reduction is independent of actual brake pressure are inefficient, thereby resulting in slow brake pressure recovery and excessive braking distances.

The prior art further includes automatic braking systems wherein a desired rate of deceleration is preselected by the operator, and an electronic control circuit provides a brake signal which is indicative of the brake pressure required for the preselected rate of deceleration. Such prior art systems also include skid control circuitry, but these systems generally operate in a manner wherein the skid control circuit will control brake pressure if the skid control circuit calls for a lower braking pressure. With such systems, overdump conditions can also readily occur, resulting in braking system inefficiency. Further disadvantages of prior art automatic braking systems include the extensive use of mechanical and hydraulic controls for controlling brake pressure, and the resulting complexity of the necessary mechanical and hydraulic hardware.

It is, therefore, an object of the present invention to provide an electronically controlled braking system having skid control which is a function of the commanded brake pressure.

A further object of this invention is to provide an electronically controlled braking system wherein the amount of skid control brake pressure release is a function of the brake pressure commanded.

Still another object of the present invention is to provide a braking system wherein brake pressure is electronically controlled by an operator-actuated electrical circuit and a skid control circuit.

Another object of the present invention is to provide a braking system wherein skid control circuitry modifies an operator-commanded brake pressure signal as a function of the commanded brake pressure signal.

A further object of the present invention is to provide a selected deceleration braking system wherein electronic controls are utilized to control brake pressure.

Another object of this invention is to provide a selected deceleration braking system wherein a brake command signal is modified by a skid control circuit as a function of the brake command signal.

SUMMARY OF THE INVENTION

The foregoing and other objects and purposes of the invention are accomplished by the disclosed braking system which includes circuitry for generating a brake command signal, a skid control circuit, and brake pressure modification circuitry for modifying the brake command signal as a function of both the command signal and the skid control output. Specifically, the brake pressure modification circuitry modifies the brake command signal in such a manner that the brake pressure is reduced by an amount determined by the multiplication of the brake command signal with the skid control output.

One disclosed embodiment of the circuitry for generating a brake command signal is an electrical circuit which is responsive to operator actuation of a brake pedal to provide a brake command signal representative of the desired brake pressure.

Another disclosed embodiment of the circuitry for generating a brake command signal includes a selected deceleration circuit and an operator actuated pedal position encoder which provides a deceleration rate signal as a function of pedal displacement. The selected deceleration circuit is responsive to the deceleration signal and vehicle deceleration, and provides a brake command signal representative of the brake pressure necessary to achieve the selected rate of deceleration.

The disclosed braking system further includes a valve driver for generating a valve driving current in response to the modified brake command signal as determined by the brake command signal and the skid control circuitry, and a brake servo valve which controls the applied brake pressure in response to the driving current.

BRIEF DESCRIPTION OF THE DRAWINGS

The features and advantages of the disclosed invention will be readily apparent from the detailed description of the disclosed invention, when read in conjunction with the drawing wherein:

FIG. 1 is a schematic diagram of the disclosed electronically controlled braking system.

FIG. 2 is a schematic diagram of an operator actuated brake command circuit for use in the braking system of FIG. 1.

FIG. 3 is a schematic diagram of another operator actuated brake command circuit for use in the braking system of FIG. 1.

DETAILED DESCRIPTION OF THE DISCLOSURE

Figure 4:
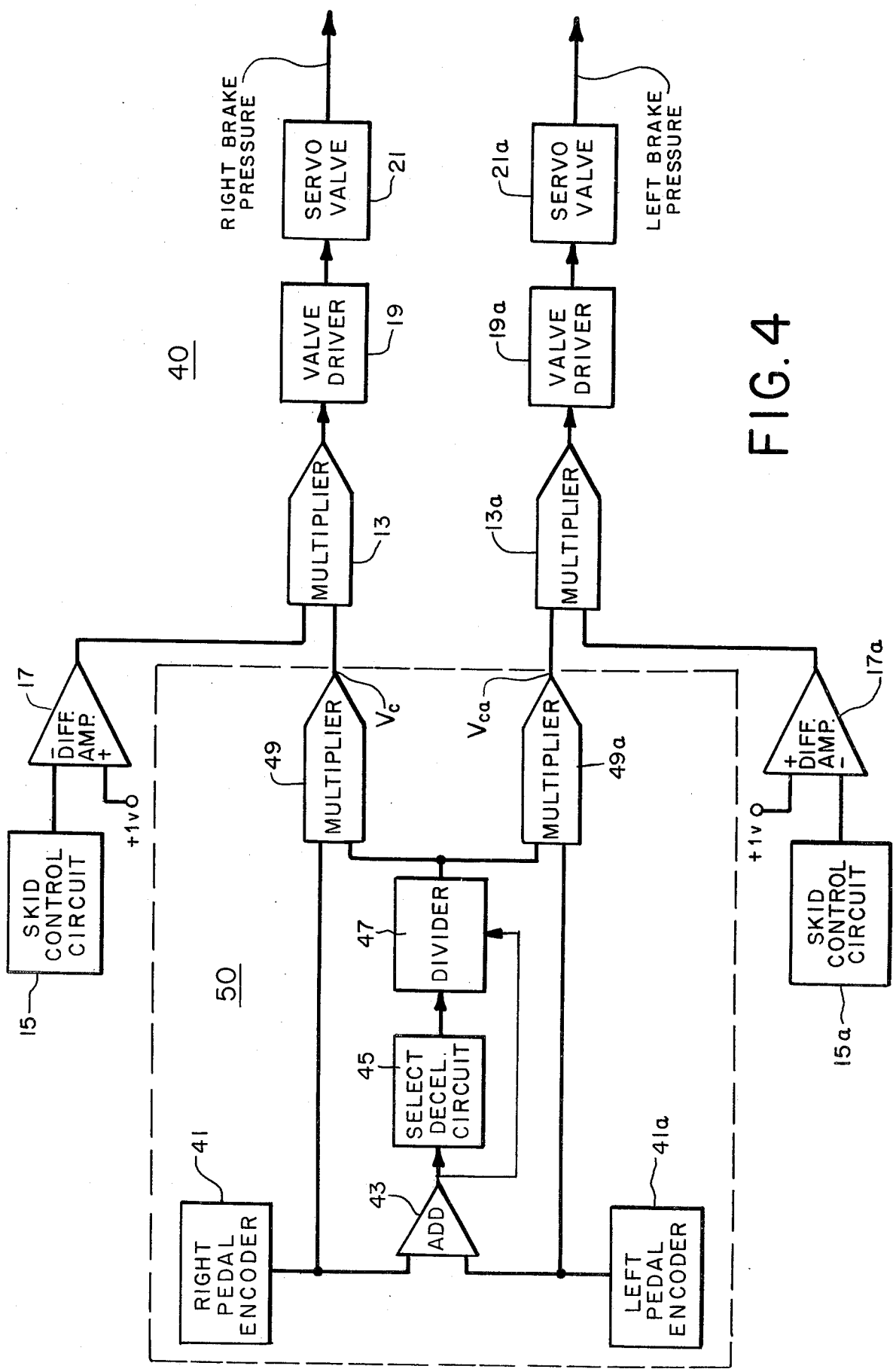
FIG. 4 is a schematic diagram of an electronically controlled braking system having an operator pedal controlled selected deceleration circuit.

FIG. 1 schematically illustrates an electronically controlled brake and skid control system 10 wherein an electrical brake command signal and a skid control signal cooperate to establish a brake pressure.

Specifically, the braking system 10 includes a brake command circuit 11 that provides a brake command signal $V_c$ as an output. Particular apparatus which may be used in the brake command circuit 11 are disclosed further herein. However, the brake command circuit 11 can be generally described as a circuit which provides a variable brake command signal $V_c$ which is representative of the brake pressure to be applied. For example, the brake command signal may be representative of the brake pressure desired by the vehicle operator, or it may be representative of the brake pressure determined by an automatic braking system. The brake command signal $V_c$ is applied as an input to a multiplier 13, which may be any of several commercially available integrated circuit multipliers. For example, the Motorola MC 1494L, 1495L, 1594L or 1595L can be used.

The braking system 10 further includes a skid control circuit 15 which provides a skid control signal $V_{sc}$ which in the disclosed system is assumed to be an increasing function of skid error detected by the skid control circuit 15. Skid control circuits are generally known in the art, and an example of a skid control circuit which may be used in the disclosed system is disclosed in U.S. Pat. No. 3,724,916, issued to Edgar A. Hirzel on Apr. 3, 1973, and entitled "CONTROLLED WHEEL BRAKING SYSTEM".

The skid control signal $V_{sc}$ is applied to the inverting input of a differential amplifier 17, which has its noninverting input connected to a supply of positive voltage having a value of one volt. Therefore, the differential amplifier 17 provides a modified skid control output voltage $V_m$ which is given by the following equation:

$$V_m = 1 - V_{sc} \qquad \text{(Eq. 1)}$$

This output voltage $V_m$ is applied to the other input of the multiplier 13.

The multiplier 13 provides a modified brake pressure voltage output $V_{bp}$ which is the product of the voltages $V_c$ and $V_m$ from the brake command circuit 11 and the differential amplifier 17, respectively. Therefore, the modified brake pressure voltage $V_{bp}$ provided by the multiplier 13 is given by the following equations:

$$V_{bp} = (V_C) \cdot (1 - V_{sc}) \qquad \text{(Eq. 3)}$$
$$= V_c - (V_c \cdot V_{sc}) \qquad \text{(Eq. 4)}$$

From the foregoing equations it is readily evident that the commanded brake pressure (represented by $V_c$) is reduced whenever the skid control circuit 15 provides an output $V_{sc}$ which is positive. The amount of reduction is represented by the product of the brake command voltage $V_c$ and the skid control output signal $V_{sc}$.

In order to prevent the modified brake pressure voltage $V_{bp}$ from becoming negative, the quantity $(1-V_{sc})$ should always be greater than or equal to zero. Also, with respect to the chosen voltages of the disclosed braking system 10, $V_{sc}$ should always be positive, otherwise the modified brake pressure voltage $V_{bp}$ could become greater than the operator commanded pressure voltage $V_c$. Thus, both of the following constraints on the braking system 10 are necessary:

$$0 \leq (1-V_{sc}) \leq 1 \qquad \text{(Eq. 5)}$$

$$0 \leq V_{sc} \qquad \text{(Eq. 6)}$$

In the disclosed system 10 of FIG. 1, $V_{sc}$ is an increasing function of skid error and is, therefore, zero when no skid control is necessary. Further, the positive source of one volt is coupled to the noninverting input of the differential amplifier 17. Thus, the foregoing constraints of Eqs. 5 and 6 can be accomplished by scaling and clamping the skid control voltage $V_{sc}$ so that it does not exceed one volt. Of course, the clamped one volt value of $V_{sc}$ should correspond to the maximum pressure release, and the remaining portion of the range of $V_{sc}$ between zero and one volt should be scaled for the fraction of pressure release desired.

The system 10 further includes a valve driver 19 which accepts the modified brake pressure command voltage $V_{bp}$ and generates a current output $I_{bp}$ as function of $V_{bp}$. The current $I_{bp}$ is used to drive a servo valve 21 which provides hydraulic pressure for the appropriate wheel brake cylinder or cylinders (not shown) as a function of $I_{bp}$. Although not shown it should be clear that the servo valve 21 accepts system hydraulic pressure and modulates the system pressure as a function of the valve driver output $I_{bp}$ to provide brake pressure. An example of a valve suitable for use in the disclosed braking system is disclosed in U.S. Pat. No. 4,053,187, issued to Robert D. Cook on Oct. 11, 1977 and entitled "SINGLE GAIN SKID CONTROL VALVE AND SKID CONTROL SYSTEM".

Thus, scaling the skid control signal $V_{sc}$ within the limits of Eqs. 5 and 6 to provide an indication of maximum pressure release and one volt results in $V_{sc}$ being representative of the fractional amount by which the command brake pressure, represented by $V_c$, is to be reduced. Stated another way, the quantity $(1-V_{sc})$ represents the fractional amount of the command brake pressure, represented by $V_c$, which will be applied by the servo valve 21.

Of course, it would be possible to use a skid control circuit which provides an output which is a decreasing function of skid error, in which case the differential amplifier would not be necessary. However, in order to reduce the command brake pressure by a fractional amount represented by the skid control signal, such a skid control circuit would have to produce a one volt output when no skid control is required, and a zero output when full release is required. Thus, a skid control circuit having the foregoing output characteristics could be directly connected to the multiplier 13.

If $V_{sc}'$ represents the output of a skid control circuit wherein the output $V_{sc}'$ is an inverse function of skid error and if $V_{sc}'$ is limited to be between one volt and zero volts (which represent no release and full release, respectively), then the modified brake pressure voltage $V_{bp}$ and the limits of $V_{sc}'$ for such a system would be expressed as follows:

$$V_{bp} = V_c \cdot V_{sc}' \qquad \text{(Eq. 7)}$$

$$0 \leq V_{sc}' \leq 1 \qquad \text{(Eq. 8)}$$

It is apparent that Eqs. 7 and 8 are similar to Eqs. 3 and 5, respectively, and merely represent the use of a skid control output $V_{sc}'$ which is an inverse function of skid error.

FIG. 2 illustrates a brake command circuit 20 which may be used as the brake command circuit 11 for providing the brake command signal $V_c$ in the electronically controlled braking system 10 of FIG. 1.

The brake command circuit 20 includes a pedal actuated transducer such as a linear-variable differential transformer 23 (LVDT) which is controlled by an appropriately coupled operator actuated brake pedal (not shown). An oscillator 25 generates a constant amplitude AC voltage and provides the necessary excitation voltage to the LVDT 23. The LVDT 23 is responsive to the displacement of the operator actuated pedal and generates an AC output voltage $V_{ac}$ which has an amplitude proportional to the displacement of the pedal. The LVDT output voltage $V_{ac}$ is applied to a demodulator 27 which demodulates the AC voltage and provides a DC voltage, which is a function of the amplitude of $V_{ac}$. The demodulator output is amplified by an amplifier 29 which generates a DC output voltage $V_c$ which is, therefore, a function of operator pedal displacement. Thus, $V_c$ represents a brake pressure commanded by the operator and can be applied to an input of the multiplier 13 of the braking system 10 shown in FIG. 1.

FIG. 3 illustrates a brake command circit 30 which is similar to the brake command circuit 20 shown in FIG. 2, but is for use with vehicles having dual braking control. Briefly, the circuit 30 includes structure for generating two operator actuator brake command signals which are OR'd so that the brake command voltage output of the circuit 30 corresponds to the greater operator commanded brake pressure.

The brake command circuit 30 includes a pair of LVDT's 31 and 31' which are provided for respective actuation by each of the operators. The LVDT's 31 and 31' operate in a manner similar to the LVDT 23 of FIG. 2, described previously. An oscillator 33 provides the necessary AC excitation voltage to the LVDT's 31 and 31'. The outputs of the LVDT's 31 and 31' are applied to a pair of demodulators 35 and 35', respectively. The demodulators 35 and 35' produce DC voltages which are functions of the respective AC voltage outputs from the LVDT's 31 and 31'. A pair of amplifiers 37 and 37' amplify the respective demodulator outputs, and the amplified outputs are applied to the inputs of an OR-circuit 39. The output $V_c$ of the OR-circuit 39 corresponds to the larger voltage of its two inputs. Thus, the OR-circuit output $V_c$ corresponds to the operator command signal which represents the greater commanded brake pressure and, therefore, can be applied to an input of the multiplier 13 of the braking system 10 shown in FIG. 1.

FIG. 4 is a schematic diagram of an electronically controlled braking system 40 which incorporates two systems as disclosed in FIG. 1 in parallel. The system 40 includes a brake command circuit 50 which provides two brake command outputs $V_c$ and $V_{ca}$, as shown, and, therefore, would be used with two skid control circuits, two multipliers, two valve drivers and two servo valves. As will be clear from the following discussion, the system 40 of FIG. 4 could be used for oppositely positioned right and left wheels on a vehicle, either singly or grouped on both sides.

The brake command circuit 50 includes right and left pedal position encoders 41 and 41a, respectively. Each of the pedal encoders 41 and 41a provides an output which is a function of the corresponding pedal (not shown) position. The encoder outputs are summed by an adder 43, which then provides its sum output to a selected deceleration circuit 45. The selected deceleration circuit 45 accepts the sum of both pedal encoders 41 and 41a as indicative of the desired rate of deceleration. The selected deceleration circuit 45 is further responsive to vehicle deceleration, and provides as an output an error signal which is indicative of the brake pressure required to achieve the desired rate of deceleration as represented by the sum of the outputs of the pedal position encoders 41 and 41a. Although not shown, vehicle deceleration may be determined, for example, by a linear accelerometer as is well known in the art. An example of a selected deceleration circuit which may be used in the brake command circuit 50 of FIG. 4 is disclosed in U.S. Pat. No. 4,022,513, issued on May 10, 1977 to Edgar A. Hirzel and Robert D. Cook, entitled "SELECTIVE DECELERATION BRAKE CONTROL SYSTEM".

The output of the selected deceleration circuit 45 is applied to a divider 47 which also accepts from the adder 43 the sum of the pedal encoder outputs. The divider 47 divides the selected deceleration circuit output by the sum of the encoder outputs, and the resulting quotient is applied to a pair of right and left multipliers 49 and 49a. Each right and left multiplier 49 and 49a receives as another input the output of the corresponding right and left pedal encoder 41 and 41a. Thus, the right and left multiplier provide respective brake command outputs $V_c$ and $V_{ca}$ which together represent the braking pressures necessary to achieve the desired vehicle deceleration as represented by the outputs of the pedal encoders 41 and 41a. Moreover, the multiplier outputs $V_c$ and $V_{ca}$ are also indicative of any right-left differential braking desired by the operator.

The brake command signals $V_c$ and $V_{ca}$ are each utilized by components which correspond to certain components disclosed and described with respect to FIG. 1. Therefore, the operation of these components will not be described, but for purposes of clarity have been numbered in FIG. 4 with reference numerals corresponding to the reference numerals of like elements in FIG. 1. Thus, the corresponding elements for the right brake pressure have been designated with the same numbers as in FIG. 1, and the corresponding elements for the left brake pressure are similarly designated but are suffixed with the letter "a".

Although individual skid control circuits 15 and 15a are shown in FIG. 4, a single averaging type skid control circuit, and a single differential amplifier, could be used to provide the skid control signal to both multipliers 13 and 13a.

In summary, therefore, the foregoing has been a disclosure of an electronically controlled braking system as generally shown in FIG. 1. The system 10 of FIG. 1 includes structure for modifying an electrical signal representative of a commanded brake pressure by means of a skid control signal which is multiplied with the brake command signal. FIGS. 2 through 4 show several circuits for generating an electrical signal representative of a commanded brake pressure.

Although the foregoing has been a description of specific embodiments, it will be appreciated by those skilled in the art that various modifications and changes can be made without departing from the spirit and scope of the invention which is defined by the following claims.

What is claimed is:

1. In a braking system having a valve driver and a brake pressure modulating servo valve, a brake and skid control comprising:

brake command means for generating a brake command signal indicative of a commanded brake pressure;

skid control means for generating a skid control signal which is independent of said brake command signal; and modification means responsive to said brake command signal and said skid control signal for providing to the valve driver a modified brake command signal indicative of a modified brake pressure, wherein said modification means includes means for setting said modified brake pressure to a value less than said commanded brake pressure by an amount which is a function of both said brake command signal and said skid control signal.

2. The brake and skid control of claim 1 wherein said modified brake pressure is a function of the product of said brake command signal and said skid control signal.

3. The brake control of claim 2 wherein said skid control means includes means for maintaining said skid control signal within a predetermined range of values such that the magnitude of the difference between the commanded brake pressure and the modified brake pressure does not exceed the magnitude of the commanded brake pressure.

4. The brake and skid control of claim 1 wherein said modification means includes means for multiplying the brake command signal by the difference between the skid control signal and a predetermined constant value such that the modified brake command signal is equal to the difference between the brake command signal and the product of said brake command signal with said skid control signal.

5. The brake and skid control of claim 4 wherein said skid control means includes means for maintaining said skid control signal within a predetermined range of values such that the product of said brake command signal with said skid control signal never exceeds said brake command signal.

6. The brake and skid control of claim 1 wherein said brake command means comprises operator actuated means for generating said electrical brake command signal, and wherein said electrical brake command signal is indicative of operator commanded brake pressure.

7. The brake and skid control of claim 6 wherein said operator actuator means comprises a pedal actuated transducer having an output which is a function of pedal displacement.

8. The brake and skid control of claim 1 wherein said brake command means includes means for generating a deceleration signal indicative of an operator selected deceleration, and selected deceleration circuit means responsive to said deceleration signal and vehicle deceleration for providing said brake command signal, said selected deceleration means controlling said brake command signal to maintain vehicle deceleration substantially at the preselected deceleration.

9. In a braking system having a valve driver and a brake pressure modulating servo valve, a brake and skid control comprising:
operator actuated means for commanding a brake pressure;
skid control means for generating an error signal indicating a braking condition; and
modification means responsive to said operator actuated means and to said error signal for establishing a modified brake pressure in proportion to the commanded pressure and as a function of said error signal.

10. The brake and skid control of claim 9 wherein said modification means includes means for setting said modified brake pressure to a value equal to said commanded pressure in the absence of said error signal and to a value less than the commanded pressure by an amount which is proportional to both the commanded pressure and the value of said error signal when said error signal is present.

11. The brake and skid control of claim 10 wherein said skid control means includes means for maintaining the error signal within a predetermined range of values such that the magnitude of said proportional amount never exceeds the magnitude of said operator determined pressure.

12. The brake and skid control of claim 9 wherein said operator actuated means generates a signal representative of operator commanded brake pressure.

13. The brake and skid control of claim 12 wherein said operator actuated means includes pedal transducer means for generating said signal as a function of operator brake pedal displacement.

14. The brake and skid control of claim 9 wherein said operator actuated means includes means for generating a deceleration signal indicative of an operator selected deceleration, and selected deceleration circuit means responsive to said deceleration signal and vehicle deceleration for generating a signal to control brake pressure to maintain the preselected deceleration.

15. In a vehicle braking system having a brake pressure modulating servo valve, a brake control comprising:
pedal actuated means for generating a command signal representative of operator selected vehicle deceleration, said pedal actuated means including individual right and left pedal position encoders for generating respective right and left encoder signals, and summing means for adding together said right and left encoder signals to provide said command signal;
selected deceleration circuit means responsive to said command signal and to vehicle deceleration for generating a braking error signal indicative of the braking action necessary to achieve the deceleration represented by said command signal; and
control means responsive to said braking error signal for controlling the brake pressure modulating servo valve as a function of said braking error signal.

16. The brake control of claim 15 wherein each of said right and left encoder signals is indicative of a respective selected deceleration.

17. The brake control of claim 16 wherein said control means includes skid control means for modifying said braking error signal to provide a brake pressure signal, and valve driving means responsive to said brake pressure signal for controlling the brake pressure modulating servo valve.

18. In a braking system having a valve driver and a brake pressure modulating servo valve, a brake and skid control comprising:
brake command means for generating a brake command signal indicative of a commanded brake pressure;
skid control means for generating a skid control signal which is independent of said brake command signal; and
modification means responsive to the brake command signal and the skid control signal for providing to the valve driver a modified brake command signal indicative of a modified brake pressure, said modified brake pressure being a function of the product of the brake command signal and the skid control signal.

19. The brake and skid control of claim 18 wherein the modification means includes means for multiplying the brake command signal and the skid control signal such that the modified brake command signal is equal to the product of the brake command signal and the skid control signal.

20. The brake and skid control of claim 18 wherein the modification means includes means for generating an inverted skid control signal which is a function of the difference between the skid control signal and a predetermined constant, and further, wherein the modification means includes means for multiplying the brake command signal and the inverted skid control signal such that the modified brake command signal is equal to the product of the brake command signal and the inverted skid control signal.

21. The brake and skid control of claim 18, 19 or 20 wherein the skid control means includes means for maintaining the skid control signal within a predetermined range of values such that the magnitude of the difference between the commanded brake pressure and the modified brake pressure does not exceed the magnitude of the commanded brake pressure.

22. In a vehicle braking system having individual right and left brake pressure modulating valves, a brake control comprising:
 individual right and left encoders for generating respective right and left encoder signals representative of operator selected vehicle deceleration;
 summing means for adding together said right and left encoder signals to provide as its output a command signal indicative of combined operator selected vehicle deceleration;
 selected deceleration circuit means responsive to said command signal and to vehicle deceleration for generating a braking error signal indicative of the braking action necessary to achieve the deceleration represented by the command signal;
 right command means responsive to said braking error signal and said right encoder signal for controlling the right pressure modulating valve as a function of both said braking error signal and said right encoder signal; and
 left command means responsive to said braking error signal and said left encoder signal for controlling the left pressure modulating valve as a function of both said braking error signal and said left encoder signal.

23. The brake control of claim 22 wherein said right and left command means control the right and left pressure modulating valves, respectively, as a function of the product of said braking error signal and said right and left encoder signals, respectively.

24. In an aircraft braking system having a brake pressure modulating servo valve, an electronic brake control comprising:
 pedal actuated means for generating an effectively continuously variable electrical command signal representative of operator selected aircraft deceleration, said pedal actuated means including individual right and left pedal position encoders for generating respective right and left encoder signals, and summing means for adding together said right and left encoder signals to provide said electrical command signal;
 selected deceleration circuit means responsive to said electrical command signal and to aircraft deceleration for generating a braking error signal indicative of the braking action necessary to achieve the deceleration represented by said electrical command signal; and
 command means responsive to said braking error signal for controlling the brake pressure servo modulating valve as a function of said braking error signal.

25. The electronic brake control of claim 24 wherein each of said right and left encoder signals is indicative of a respective selected deceleration.

26. In a vehicle braking system having right and left brake pressure modulating valves, a brake control comprising:
 individual right and left pedal position encoders for generating respective right and left encoder signals;
 summing means for adding together said right and left encoder signals to provide a summation signal indicative of operator selected vehicle deceleration;
 selected deceleration circuit means responsive to said summation signal and to vehicle deceleration for generating a brake error signal indicative of the braking action necessary to achieve the deceleration indicated by said summation signal;
 means, responsive to the right encoder signal and the brake error signal, for generating a right brake command signal indicative of commanded right brake pressure, wherein said right brake command signal is a function of both said right encoder signal and said brake error signal;
 means, responsive to the left encoder signal and the brake error signal, for generating a left brake command signal indicative of commanded left brake pressure, wherein said left brake command signal is a function of both said left encoder signal and said brake error signal;
 means, responsive to the right brake command signal, for controlling the right brake pressure modulating valve as a function of said right brake command signal; and
 means, responsive to the left brake command signal, for controlling the left brake pressure modulating valve as a function of said left brake command signal.

27. The brake control of claim 26 wherein said right brake command signal is a function of the product of said right encoder signal and said brake error signal, and said left brake command signal is a function of the product of said left encoder signal and said brake error signal.

* * * * *